US008260579B2

(12) United States Patent
Bickel et al.

(10) Patent No.: US 8,260,579 B2
(45) Date of Patent: Sep. 4, 2012

(54) AUTOMATIC IDENTIFICATION OF MULTIPLE POWER GRIDS USING DATA SYNCHRONIZATION

(75) Inventors: Jon A. Bickel, Murfreesboro, TN (US); Ronald W. Carter, Murfreesboro, TN (US)

(73) Assignee: Schneider Electric USA, Inc., Palatine, IL (US)

(*) Notice: Subject to any disclaimer, the term of this patent is extended or adjusted under 35 U.S.C. 154(b) by 582 days.

(21) Appl. No.: 12/496,301

(22) Filed: Jul. 1, 2009

(65) Prior Publication Data

US 2011/0004324 A1    Jan. 6, 2011

(51) Int. Cl.
*G06F 11/00*      (2006.01)

(52) U.S. Cl. .................................................. 702/188

(58) Field of Classification Search ............ 702/57–60, 702/64, 65, 75, 118, 121, 122, 183, 188; 726/6
See application file for complete search history.

(56) References Cited

U.S. PATENT DOCUMENTS

| 3,654,479 | A | 4/1972 | Catherin |
| 3,973,087 | A | 8/1976 | Fong |
| 4,855,671 | A | 8/1989 | Fernandes |
| 5,272,439 | A | 12/1993 | Mashikian et al. |
| 5,473,244 | A | 12/1995 | Libove et al. |
| 5,874,903 | A | 2/1999 | Shuey et al. |
| 5,978,371 | A | 11/1999 | Mason, Jr. et al. |
| 6,020,657 | A | 2/2000 | Liran |
| 6,088,659 | A | 7/2000 | Kelley et al. |
| 6,094,650 | A | 7/2000 | Stoffel et al. |
| 6,100,817 | A | 8/2000 | Mason, Jr. et al. |
| 6,266,452 | B1 | 7/2001 | McGuire |
| 6,288,456 | B1 | 9/2001 | Cratty |
| 6,292,683 | B1 | 9/2001 | Gupta et al. |
| 6,574,672 | B1 | 6/2003 | Mitchell et al. |
| 6,694,125 | B2 | 2/2004 | White et al. |
| 6,731,904 | B1 | 5/2004 | Judd |
| 7,065,350 | B2 | 6/2006 | Capobianco et al. |

(Continued)

FOREIGN PATENT DOCUMENTS

GB    2 220 573 A    1/1990

(Continued)

OTHER PUBLICATIONS

Written Opinion corresponding to International Patent Application No. PCT/US2010/040530, European Patent Office, dated Mar. 25, 2011, (6 pages).

(Continued)

*Primary Examiner* — Mohamed Charioui
(74) *Attorney, Agent, or Firm* — Nixon Peabody LLP

(57) ABSTRACT

A method of automatically identifying whether intelligent electronic devices (IEDs) in a power monitoring system are in multiple electrical grids. A controller sends an instruction to each IED in a predetermined time sequence such that each IED receives the instruction at a different time, commanding each IED to begin logging frequency variation data in a current/voltage signal monitored by the IED and to send the data to the controller and an associated cycle count. The controller receives the variation data and associated cycle count and determines a peak correlation using a data alignment algorithm on IED pair combinations. If the IEDs are on the same electrical grid, the peak correlations should occur at cycle count offsets that match the order that the IEDs received the instruction. Any discrepancies in the expected order of peak correlations are flagged, and the corresponding IEDs are determined to be on different grids.

21 Claims, 10 Drawing Sheets

U.S. PATENT DOCUMENTS

| | | | |
|---|---|---|---|
| 7,079,808 | B2 | 7/2006 | Striemer |
| 7,265,334 | B2 | 9/2007 | Draper et al. |
| 7,761,910 | B2 * | 7/2010 | Ransom et al. .................. 726/6 |
| 8,082,367 | B2 * | 12/2011 | Etheridge et al. ............. 709/248 |
| 2003/0014678 | A1 | 1/2003 | Ozcetin et al. |
| 2003/0033094 | A1 | 2/2003 | Huang |
| 2003/0222509 | A1 | 12/2003 | Andarawis et al. |
| 2004/0121648 | A1 | 6/2004 | Voros |
| 2004/0225649 | A1 | 11/2004 | Yeo et al. |
| 2005/0050095 | A1 | 3/2005 | Hurtis et al. |
| 2005/0200205 | A1 | 9/2005 | Winn et al. |
| 2006/0167569 | A1 | 7/2006 | Colombi et al. |
| 2006/0271244 | A1 | 11/2006 | Cumming et al. |
| 2007/0014313 | A1 | 1/2007 | Bickel et al. |
| 2007/0179726 | A1 | 8/2007 | Bickel |
| 2007/0206521 | A1 | 9/2007 | Osaje |
| 2007/0236359 | A1 | 10/2007 | Wynans et al. |
| 2008/0065712 | A1 | 3/2008 | Bickel |

FOREIGN PATENT DOCUMENTS

| | | |
|---|---|---|
| WO | WO 00/65480 | 11/2000 |
| WO | WO 03/030396 A2 | 4/2003 |
| WO | WO 2004/032371 A1 | 4/2004 |
| WO | WO 2005/055478 A1 | 6/2005 |
| WO | WO 2005/059572 A1 | 6/2005 |

OTHER PUBLICATIONS

International Search Report corresponding to International Patent Application No. PCT/US2010/040530, European Patent Office, dated Mar. 25, 2011, (4 pages).

Coggins D. et al.; "Initial Experiences with a New FPGA Based Traveling Wave Fault Recorder Installed on a MV Distribution Network"; XP031404414; Power System Technology and IEEE Power India Conference; dated 2008; (8 pages).

Written Opinion corresponding to International Patent Application No. PCT/US2006/025445, European Patent Office, dated Nov. 24, 2006, 7 pages.

International Search Report corresponding to International Patent Application No. PCT/US2006/025445, European Patent Office, dated Nov. 24, 2006, 3 pages.

PCT Written Opinion for International Application No. PCT/US2006/025444, European Patent Office, dated Oct. 10, 2006 (9 pages).

PCT Search Report for International Application No. PCT/US2006/025444, European Patent Office, dated Oct. 10/2006 (6 pages).

Article: "*Cross Correlation—Auto Correlation—2D Pattern Identification*," by Paul Bourke, dated Aug. 1996, 11 pages.

Article: "*The Need For Speed*," by Richard P. Bingham, Dranetz-BM1, dated Nov. 1999, 12 pages.

Article: "*GPS World—Pacify The Power GPS Harness For Large-Area Electrical Grid*," by Dennis Erickson and Carson Taylor, dated Apr. 1, 2005, 9 pages.

Article: "*Protection, Control, Reliability and Diagnostic Improvements Via Single-Processor Control Of Circuit Breakers In Low Voltage Switchgear*," IEEE, copyright 2005, 10 pages.

Article: "InnovationTo Reality—Introducing State-Of-The-Art Protection And Monitoring To Existing Low-Voltage Switchgear," IEEE, copyright 2005, 11 pages.

Article: "Entellisys™ Low-Voltage *Switchgear*," GE Consumer & Industrial Electrical Distribution; dated 2005; 17 pages.

Article: "*Automated Decision Tree Generation For Object Recognition And Classification*," Ren C. Luo et al., Proceedings of the International Conference on Industrial Electronics, Control and Instrumentation (IECON), Industrial Applications of Mini, Micro and Personal Computers, Document No. XP-002056809, dated Sep. 29, 1986, pp. 357-362.

* cited by examiner

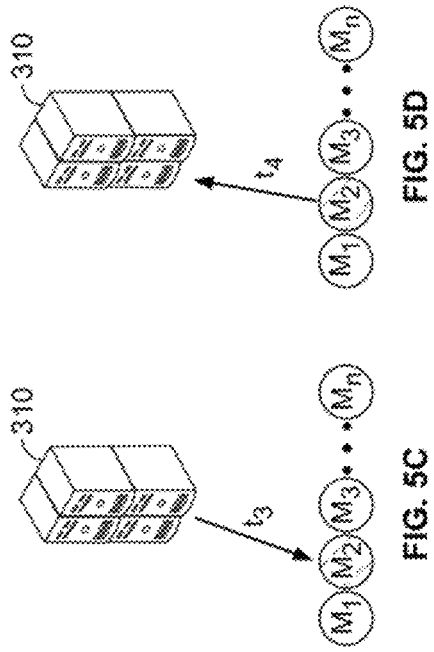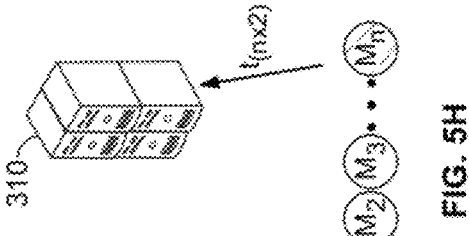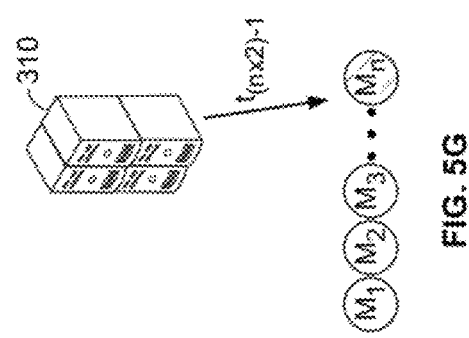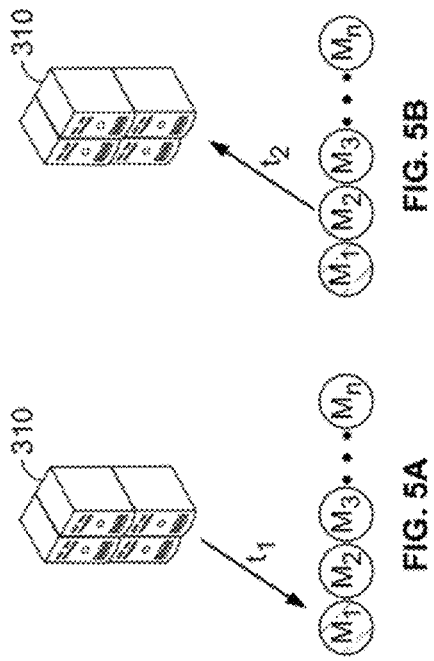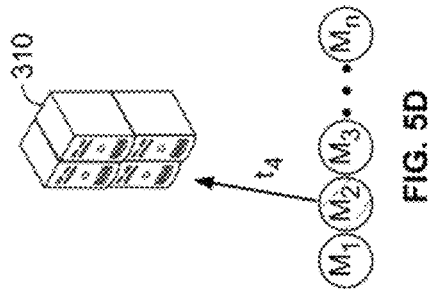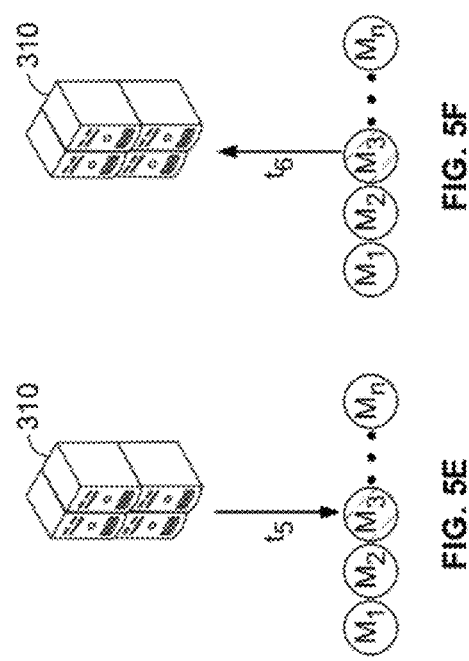

AUTOMATIC IDENTIFICATION OF MULTIPLE POWER GRIDS USING DATA SYNCHRONIZATION

FIELD OF THE INVENTION

Aspects disclosed herein relate generally to power monitoring systems, and, more particularly, to methods for automatically identifying multiple electrical grids using automated data synchronization and automated grid identification methods.

BACKGROUND

The ability to synchronize data (voltage, current, time, events, etc.) in a power monitoring system is a valuable tool for end-users. Synchronizing information from power system devices, called intelligent electronic devices (IEDs), is not so much important from a temporal perspective (although it can be used to synchronize clocks) as it is to synchronize data from all IEDs to the same point in time that an event in a power system actually occurred. Although IEDs may record data simultaneously, it is more difficult and expensive to synchronize the IEDs' data together because each IED has its own clock that is used to timestamp when the data was acquired. Because the IEDs' clocks operate independently of each other, the timestamp for an event will be different for each IED. The end-user must synchronize the events manually when analyzing the data, which requires an advanced level of expertise. Global positioning satellite (GPS) time systems can be used, but the end-user has to purchase and install additional hardware and data lines to link the IEDs together and to the satellite system. There are also some limitations for synchronizing data with GPS time systems due to time latencies associated with other hardware in the system, compatibility limitations of hardware, loss of signal from the satellites, and complex configuration of the power system.

Having the IEDs' data synchronized and knowledge of the power system hierarchy provides the basic requirements for many types of sophisticated data analyses, which were previously very expensive and complex. This information can be used to troubleshoot problems, increase equipment and system performance, improve safety, and save money. Automated data synchronization techniques are disclosed in co-pending U.S. patent application Ser. No. 11/174,099, filed Jul. 1, 2005, entitled "Automated Precision Alignment of Data in a Utility Monitoring System".

All real-world electrical signals in power systems experience subtle changes in their frequency and amplitude over time. The modulation of a power signal's frequency and amplitude are both indeterminate and unique with respect to time. Each IED located on the same electrical grid will experience simultaneously the same frequency fluctuations during steady-state load conditions. IEDs that are directly linked to each other in their respective hierarchy will see a stronger correlation in their amplitude modulation. Frequency and/or amplitude modulation of the signal can be used to precisely synchronize the data of one IED with respect to another IED (or all the IEDs to each other).

The need to synchronize data across multiple power monitoring systems is increasing as the sophistication and sensitiveness of power systems evolve. Synchronizing monitoring system data allows end users to determine how an event propagated through their power system, how it affected their equipment, and potentially how to mitigate reoccurrences.

Systems that use large uninterruptible power supplies (UPSs), such as data centers, server farms, etc., have at least two or more independent grids: the electrical grid from a power utility provider and one or more UPS grids. Because these grids are intentionally isolated from each other and typically operate independently from each other, data synchronization is a challenge. While a solution to align data from the multiple electrical or power grids has been described in co-pending, commonly assigned U.S. patent application Ser. No. 12/262,802, filed Oct. 31, 2008, entitled "Automated Synchronization of Data Between Electrical Grids", there is presently no solution to automatically identify and place IEDs on their respective grid (heretofore the end-user had to identify which electrical or power grid each discrete IED belonged to). The ability to identify multiple electrical grids and their respective IEDs is an integral part of an automated solution for end-users.

While the data alignment/synchronization algorithms described in U.S. patent application Ser. No. 11/174,099, filed Jul. 1, 2005, entitled "Automated Precision Alignment of Data in a Utility Monitoring System" were originally designed to synchronize data on a uniform electrical grid, methods have been found to ascertain the existence of multiple electrical grids and the placement of discrete IEDs on their respective electrical grid. This disclosure also provides additional error checking capabilities for both the data synchronization results and the spatial alignment results.

What is needed, therefore, is a method for automatically identifying multiple electrical grids in a power monitoring system. The present disclosure is directed to addressing these and other needs.

BRIEF SUMMARY

A method of automatically identifying a plurality of independent electrical grids in a utility system that includes a plurality of intelligent electronic devices (IEDs) communicatively linked to a master controller in the utility system, includes: communicating from the master controller an instruction to each of the IEDs in a sequential order at a predetermined time interval (a) to begin storing variation data indicative of variations of an electrical characteristic in a corresponding monitored current or voltage signal being monitored by respective ones of the IEDs, and (b) to store a point on the signal as a periodic indicator value; receiving from each of the IEDs the variation data and the corresponding periodic indicator value; for a plurality of pair combinations of the IEDs, automatically correlating, via the master controller, the respective variation data from each of the pair combinations to produce a plurality of first correlation values and determining, responsive to the automatically correlating, via the master controller, whether a correlation criterion is satisfied for each of the pair combinations, wherein each of the first correlation values is associated with a corresponding first periodic indicator offset value, wherein the first periodic indicator offset value corresponds to a difference between the respective periodic indicator values for the pair combination; and responsive to the correlation criterion not being satisfied for a flagged one of the pair combinations, storing an indication that the IEDs corresponding to the flagged pair combination are in different electrical grids.

The correlation criterion can be that no peak correlation value, which exceeds a predetermined amount, exists for the pair combination. The predetermined amount can be at least 25% higher than the next highest correlation value for the pair combination. The correlation criterion can be whether a peak correlation value of the first correlation values exceeds the other first correlation values by a predetermined amount. The predetermined amount can be at least 25% higher than the next highest correlation value. The correlation criterion can be whether an absolute value of the most negative of the first correlation values does not exceed an absolute value of the highest of the first correlation values by more than 25%.

The determining whether the correlation criterion is satisfied can further include determining whether a peak correlation value associated with a first pair combination of the IEDs occurs before a peak correlation value associated with the second pair combination of the IEDs; and responsive to the peak correlation value associated with the first pair combination occurring after the peak correlation value associated with the second pair combination, determining that the correlation threshold is not satisfied. The determining whether the correlation criterion is satisfied can still further include: responsive to the variation data being stored, communicating from the master controller an instruction to each of a first pair of the IEDs in a sequential order at a time interval to begin storing second variation data indicative of the electrical characteristic in the corresponding monitored current or voltage signal being monitored by respective ones of the first pair of the IEDs; receiving from each of the first pair of the IEDs the second variation data; determining which of the first correlation values for the first pair of the IEDs has a maximum value to produce a first peak correlation value, and wherein the first periodic indicator offset value corresponding to the first peak correlation value is a first peak periodic indicator offset value; automatically correlating the second variation data to produce a plurality of second correlation values, wherein each of the second correlation values is associated with a corresponding second periodic indicator offset value; responsive to the automatically correlating the second variation data: determining which of the second correlation values for the first pair of the IEDs has a maximum value to produce a second peak correlation value, and wherein the second periodic indicator offset value corresponding to the second peak correlation offset value is a second peak periodic indicator offset value, and determining whether an absolute difference between the first peak periodic indicator offset value and the second peak periodic indicator offset value exceeds a predetermined threshold; and responsive to the absolute difference exceeding the predetermined threshold, determining that the correlation criterion is not satisfied.

The periodic indicator value can be a cycle count that corresponds to a number of full or half cycles of the monitored current or voltage signal. Each of the cycles can indicate a periodic crossing of zero volts or amps by the monitored current or voltage signal.

The method can further include: responsive to the variation data being stored, communicating from the master controller an instruction to each of a first pair of the IEDs in a sequential order at a time interval to begin storing second variation data indicative of the electrical characteristic in the corresponding monitored current or voltage signal being monitored by respective ones of the first pair of the IEDs; receiving from each of the first pair of the IEDs the second variation data; determining which of the first correlation values for the first pair of the IEDs has a maximum value to produce a first peak correlation value, and wherein the first periodic indicator offset value corresponding to the first peak correlation value is a first peak periodic indicator offset value; automatically correlating the second variation data to produce a plurality of second correlation values, wherein each of the second correlation values is associated with a corresponding second periodic indicator offset value; responsive to the automatically correlating the second variation data: determining which of the second correlation values for the first pair of the IEDs has a maximum value to produce a second peak correlation value, and wherein the second periodic indicator offset value corresponding to the second peak correlation offset value is a second peak periodic indicator offset value, and determining whether an absolute difference between the first peak periodic indicator offset value and the second peak periodic indicator offset value exceeds a predetermined threshold; and responsive to the absolute difference exceeding the predetermined threshold, determining that the correlation criterion is not satisfied.

Responsive to the correlation criterion being satisfied for a flagged one of the pair combinations, the method can further include storing an indication that the IEDs corresponding to the flagged pair combination are in the same electrical grid. The predetermined threshold can be zero or less than the absolute difference between the first and second peak periodic indicator values. The master controller can be one of the IEDs. The variation data can be indicative of frequency variations or amplitude variations in the monitored current or voltage signal and the electrical characteristic can be a frequency or amplitude of the monitored current or voltage signal.

The method can further include determining a level of symmetry of the first correlation values relative to the peak correlation value as a function of the first periodic indicator offset values, and responsive to the level satisfying a criterion, determining that the correlation criterion is satisfied. The level of symmetry can be determined by applying a correlation function to the first correlation values to produce a symmetry correlation value, the criterion including whether the symmetry correlation value exceeds about 0.75.

According to another aspect, a method of automatically identifying a plurality of independent electrical grids in a utility system that includes a plurality of intelligent electronic devices (IEDs) communicatively linked to a master controller in the utility system, includes: communicating from the master controller an instruction to each of the IEDs to begin storing variation data indicative of variations of an electrical characteristic in a corresponding monitored current or voltage signal being monitored by respective ones of the IEDs; storing a first time that the instruction is communicated from the master controller to each of the IEDs; determining a second time corresponding to a time that the IED has started to store the variation data; receiving from each of the IEDs the variation data; for a plurality of pair combinations of the IEDs, automatically correlating, via the master controller, the respective variation data from each of the pair combinations to produce a plurality of first correlation values and determining, responsive to the automatically correlating, via the master controller, whether a peak one of the first correlation values occurs between the first time and the second time for one of the IEDs in the respective pair combination; and responsive to the peak one of the first correlation values not occurring between the first time and the second time, storing an indication that the IEDs corresponding to the pair combination are in different electrical grids.

The determining the second time can include communicating to the master controller an acknowledgement that the variation data is being stored. The instruction can be communicated to each of the IEDs in a sequential order at a predetermined time interval.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIGS. 5A-5H illustrate a sequence of communications between respective IEDs in the power monitoring system and the master controller to capture variation data needed by the grid identification algorithm to automatically identify which IEDs are in which electrical grids;

Figure 1:
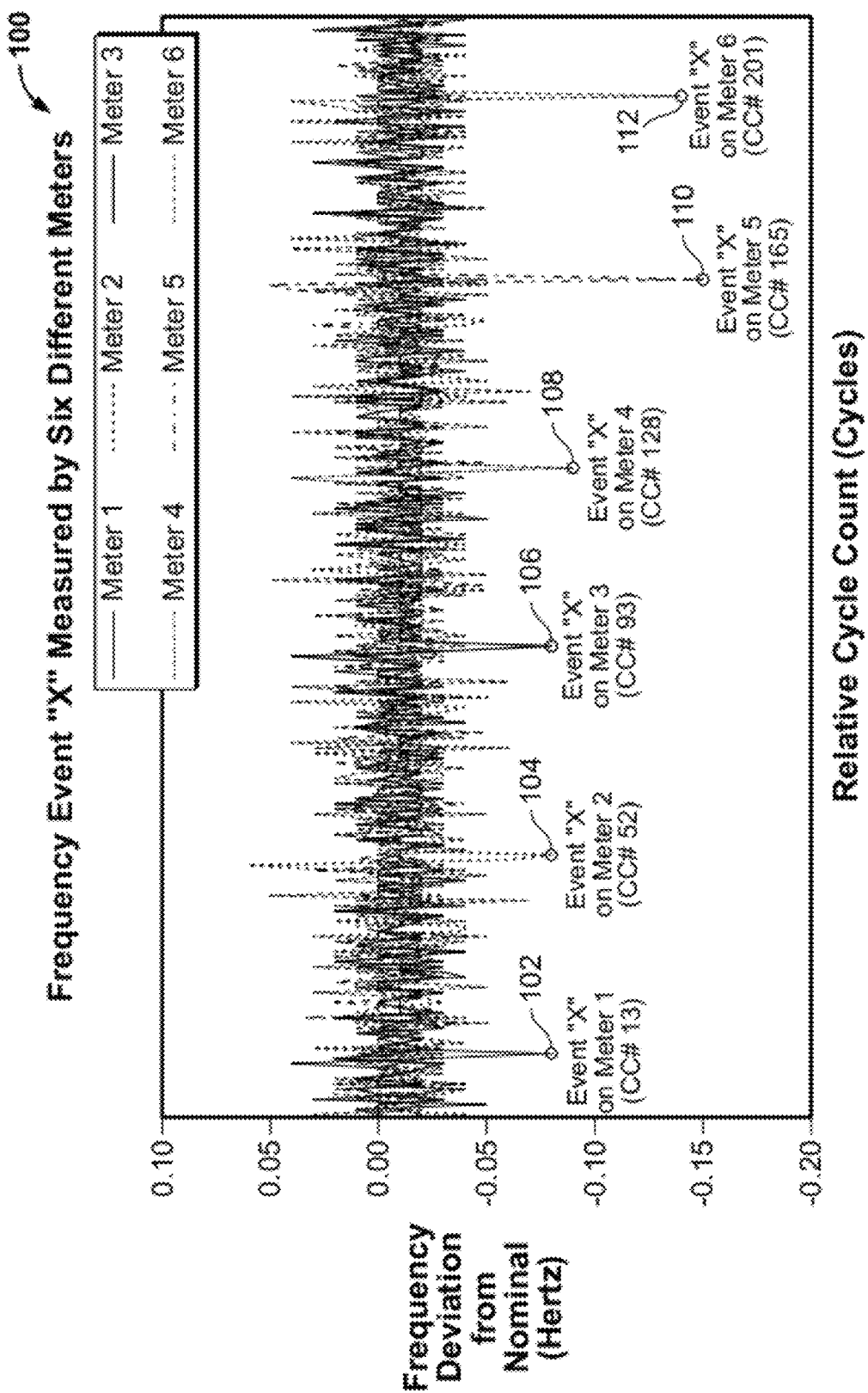
FIG. 1 is a diagram of frequency variation data measured by six different meters and their relative cycle count in cycles with points marking a single event that was recorded by all of the meters.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

An electrical or power grid is an interconnected network of conductors used to distribute electrical energy from one or more sources of energy to respective loads. For example, electrical grids distribute energy from utility power plants to homes and businesses much like roads provide paths for vehicles to travel from an origin to their destination. Electrical grids are owned and operated by hundreds of utility companies. Three major electrical utility grids currently operate in North America: the Eastern Interconnection, the Western Interconnection, and the ERCOT (Electric Reliability Council of Texas) Interconnection. Although these electrical grids are connected to each other at various points through high voltage direct current (HVDC) links, they are intentionally designed to operate electrically independently from each other. In other words, each electrical grid produces alternating current signals that are electrically isolated from alternating current signals produced by other electrical utility grids. Because these electrical grids operate independently from each other, there is no correlative relationship between their grid frequencies.

It is known to have two or more independent electrical grids within the same facility. Some energy consumers can use a combination of energy sources to attain their energy and reliability objectives. During various operational modes of these power systems, two or more independent grids can be employed. For instance, Tier 2-4 data centers use utility feeds as their primary source of energy; however, they also use other sources such as diesel generators and uninterruptible power supplies (UPSs) to provide redundant energy supplies to the loads (e.g., servers and air conditioning units). Some types of UPSs (e.g., double conversion on-line) are fed by a utility source, but their output electrical characteristics (including frequency) can be completely independent from those of the utility source because a double conversion on-line UPS first rectifies (i.e., converts to direct current or DC) the input utility source and then inverts (converts to alternating current or AC) the DC output of the rectifier to provide a truly isolated source.

Islanded systems such as those described in co-pending U.S. patent application Ser. No. 12/151,309, filed May 6, 2008, entitled "Automated Hierarchical Classification for Utility Systems with Multiple Sources", are inherently isolated from the utility grid resulting in an independent grid with unique electrical characteristics. Motor-Generator (M-G) sets provide complete line isolation via a mechanical link between one electrical grid and another, and are used to convert frequency, voltage, and phase of power. There are other methods and techniques of isolating energy sources from each other (described in the aforementioned application) with the end result being a separate electrical grid. And because these electrical grids are separated from each other, their respective grid frequency may also be independent from one another (depending on how the output frequency of the isolating method is controlled).

Figure 3:
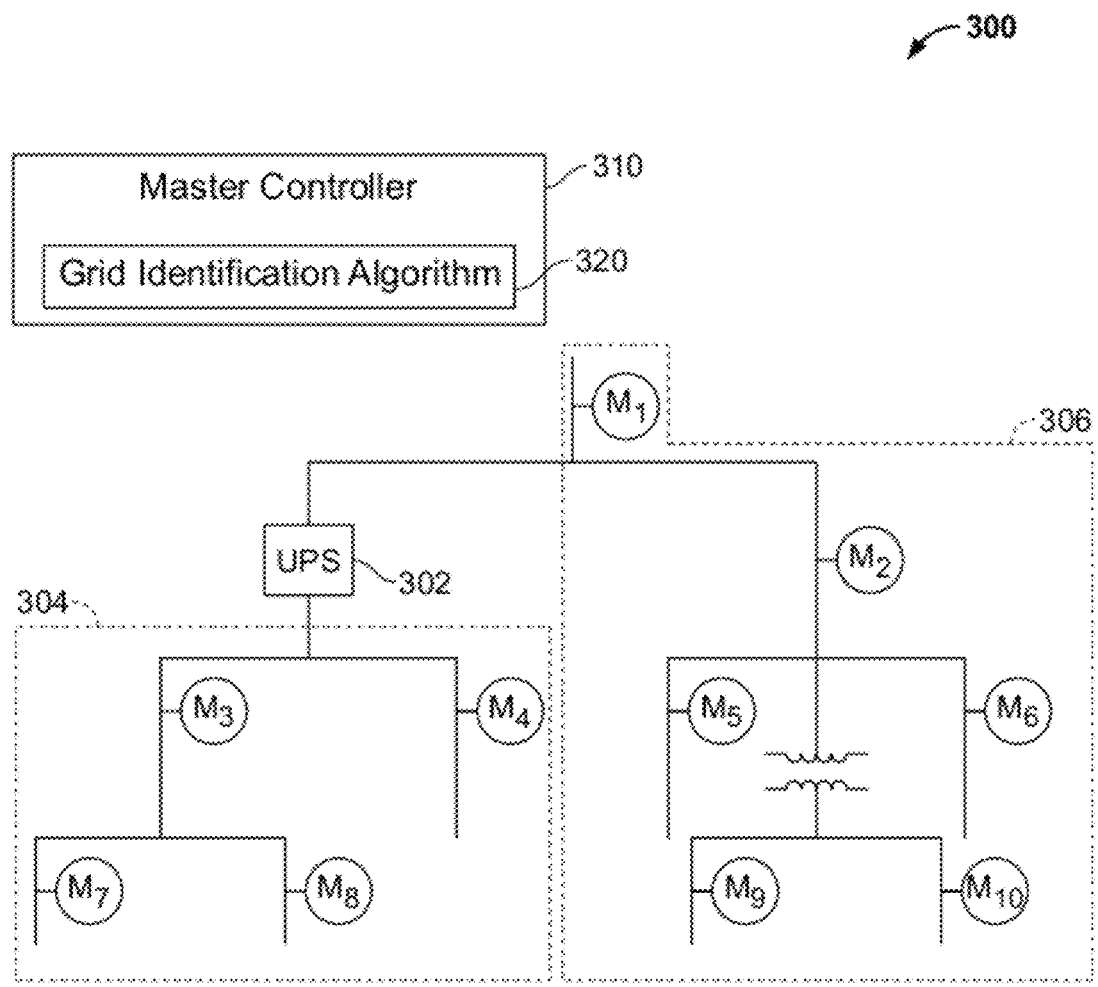
FIG. 3 is a functional block diagram of an exemplary power monitoring system that includes a master controller that executes a grid identification algorithm according to aspects of the present disclosure.

The ability to automatically identify disparate electrical grids is very important, especially in electrical systems with redundant power sources. Reference will be made to FIG. 3 to illustrate an exemplary power monitoring system 300 that includes a UPS 302 that employs double conversion. The power monitoring system 300 includes multiple intelligent electronic devices (IEDs) $M_1$-$M_{10}$ that are communicatively linked to a master controller 310 in the power monitoring system 300, which can be generically called a utility system or a power system. By "monitoring," it is meant that the power system includes IEDs that are capable of monitoring an electrical characteristic, such as current, voltage, or power. In FIG. 3, two separate electrical grids 304, 306 exist. The first electrical grid 304 includes the electrical infrastructure downstream from the UPS 302 (referred to hereinafter as the UPS grid), and the second electrical grid 306 includes all remaining electrical infrastructures within FIG. 3 (referred to hereinafter as the utility grid). The UPS grid 304 and the utility grid 306 can operate at different frequencies and/or different phase angles from each other, and, thus, are not necessarily synchronized with each other with respect to frequency and/or phase angle. One of numerous objects of this disclosure is to determine that two or more independent electrical grids exist and to identify which electrical grid each discrete IED is installed on. In some configurations, the UPS 302 can use an input signal (e.g., the voltage) from the utility grid 306 to control its output frequency. In such a case, depending on the level of output frequency control by the UPS 302 the UPS grid 304 may or may not be considered as an independent grid from the utility grid 306.

The data synchronization or alignment of a pair of IEDs involves measuring and logging frequency variation data from a pair of IEDs and statistically correlating the variation data to ascertain a relationship according to a data alignment algorithm, which can also be referred to synonymously as a data synchronization algorithm herein. As used herein, the term "data alignment algorithm" or "data synchronization algorithm" refers to any data alignment algorithm disclosed in U.S. patent application Ser. No. 11/174,099, filed Jul. 1, 2005, entitled "Automated Precision Alignment of Data in a Utility Monitoring System". Briefly, data alignment algorithm aligns or synchronizes data measured by IEDs coupled to a power monitoring system 300. The data alignment algorithm receives, at the master controller 310, reference signal data from a first of the IEDs $M_1$-$M_{10}$. The reference signal data represents frequency/amplitude/phase variations in a current or voltage being measured by the IED for a predetermined number of cycles, which can be full of half cycles, for example. For example, in the case of the power monitoring system 300, the frequency variations occur in the current or voltage from an electric grid 304 or 306. The IED stores a reference count associated with each of the cycles sensed by the IED. The data alignment algorithm receives, at the master controller 310, second signal data from a second IED. The second signal data also represents frequency/amplitude/phase variations in a current or voltage being measured by the second IED for a predetermined number of cycles. The second IED stores a second count associated with each of the number of cycles sensed by the second IED. The data alignment algorithm automatically aligns the reference signal data with the second signal data to a common reference point in the respective current or voltage sensed by the IED and the second IED by: computing correlation coefficients each produced by a cross-correlation algorithm based on at least part of the reference signal data and at least part of the second signal data until one of the correlation coefficients produced by the cross-correlation algorithm satisfies a criterion; and in response to one of the correlation coefficients satisfying the criterion, associating the reference count associated with the common reference point with the second count associated with the common reference point. The criterion can include the correlation coefficient corresponding to a maximum correlation coefficient produced by the cross-correlation algorithm. The common reference point can correspond to a zero crossing in the measured current or voltage. The reference count and the second count can each correspond to the cycle count number associated with the common reference point.

Figure 4:
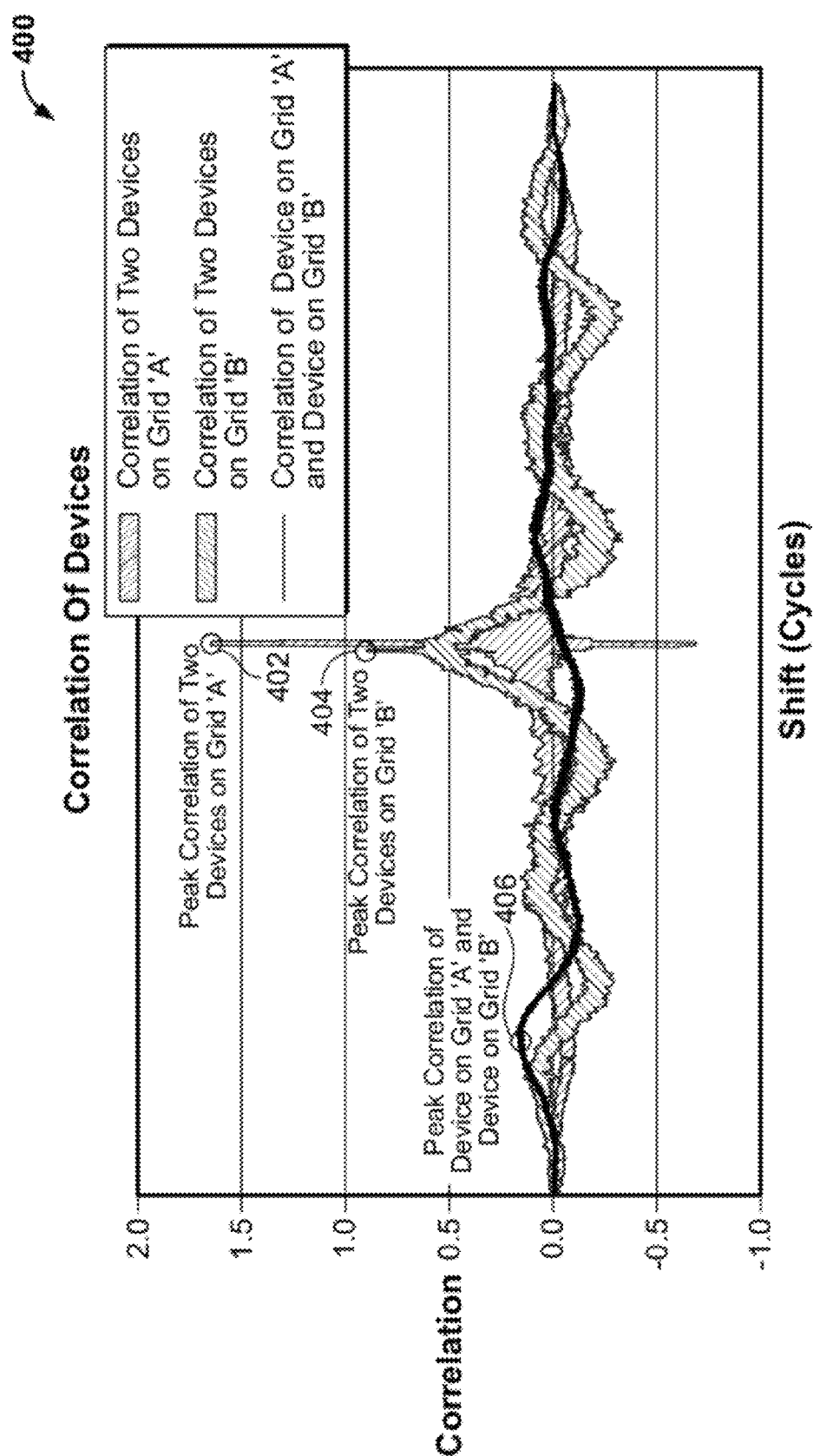
FIG. 4 is a graphical plot of correlation values and the corresponding cycle count offsets for three different IED pairs in a power monitoring system.

The master controller 310 carries out the data alignment algorithm on any given pair combination of IEDs at a time. For any given set of IEDs, there will be a number of pair combinations to which the data alignment algorithm can be applied. For example, referring to FIG. 3, $M_1$-$M_2$ is a first pair combination, $M_1$-$M_3$ is a second pair combination, $M_2$-$M_3$ is a third pair combination, and so forth. Note that it is not necessary to carry out the data alignment algorithm on each and every possible pair combination (for example, it is not necessary to synchronize the pair combination $M_1$-$M_2$ and $M_2$-$M_1$, though as explained below, it can be helpful to evaluate both of such pair combinations). FIG. 4 is a graphical plot illustrating the correlative relationships of three different pairs of IEDs in the power monitoring system 300. Note that shading is used in some of the figures due to drawing requirements, but it should be understood that the plots show discrete point-by-point data and not an area. The ordinate axis corresponds to correlation values produced by the data alignment algorithm. The abscissa axis corresponds to the corresponding periodic indicator offset value (alternately, cycle count offset) at which the correlation value occurred. The periodic indicator offset value corresponds to a shift or an offset between the pair of IEDs in their respective periodic indicators. The first correlative relationship is a pair of IEDs located on Grid A 304, such as $M_3$ and $M_4$ on the grid 304, the second correlative relationship is a pair of IEDs located on Grid B 306, such as $M_5$ and $M_6$ on the grid 306, and the third correlative relationship is a pair of IEDs located on different grids (one IED, e.g., $M_3$, on Grid A 304 and one IED, e.g., $M_2$, on Grid B 306). When the variation data indicative of variations of an electrical characteristic (e.g., frequency, amplitude, or phase) in a corresponding monitored current or voltage signal being monitored by a pair of IEDs are analyzed by the data alignment algorithm, a peak correlation is expected to occur at some periodic indicator offset value for the IED pair. A periodic indicator value can be a cycle count that corresponds to a number of cycles of the current or voltage monitored by a given IED, and the cycles can be full or half cycles, for example. A periodic indicator offset value corresponds to the difference between respective periodic indicator offset values for the IEDs in an IED pair. Each of the cycles can indicate a periodic crossing (e.g., every one, or every other one) of zero volts or amps by the current or voltage monitored by the IED. Any other periodic indicator can be used, such as every maxima or minima observed on the monitored current or voltage signal, or any other arbitrary point that is measured periodically (such as every half or full cycle of a sinusoidal current or voltage signal).

Various important aspects of each relationship will be described below using FIG. 4 as they relate to this disclosure. One of the algorithms that is executed or carried out by the master controller 310 shown in FIG. 3 is referred to as a grid identification algorithm 320 for identifying whether multiple electrical grids exist in the power monitoring system 300 and which IEDs are installed on each of the electrical grids. The grid identification algorithm 320 can correspond to any grid identification algorithm disclosed herein, including the algorithms 900 and 1000 described in connection with FIGS. 9 and 10. Note that the master controller 310 can be any IED (such as any of $M_1$, $M_2$, $M_3$, ... $M_{10}$, or $M_1$-$M_{10}$) in the power monitoring system 300, or can be incorporated into a standalone computer system or part of a computer network that is remote from and communicatively linked to the IEDs $M_1$-$M_{10}$ in the power monitoring system. For ease of illustration, lines connecting the master controller 310 to each of the IEDs to represent the conventional wired or wireless communication links have been omitted. The master controller 310 can communicate data to each of the IEDs $M_1$-$M_{10}$, including one or more instructions or commands to cause each of the IEDs $M_1$-$M_{10}$ to carry out a function, and can also receive data from each of the $M_1$-$M_{10}$. Optionally, the data between the master controller 310 and the IEDs $M_1$-$M_{10}$ can be distributed through a conventional network, such as a private network or the Internet, using conventional protocols such as the Internet Protocol (IP) and application interfaces, such as web services (WS) or extensible markup language (XML).

An IED, such as any one of $M_1$-$M_{10}$, refers to any element or apparatus with the ability to sample, collect, or measure one or more electrical characteristics of the power monitoring system 300. Examples of an IED include a virtual power monitoring point (e.g., a virtual point in the power monitoring system 300 that subtracts or adds measurements from two or more nearby IED apparatuses to produce an estimate of the measurement at that point where no physical IED apparatus exists) or a power or energy meter such as the POWERLOGIC® Series CM3xxx/CM4xxx Circuit Monitor or a POWERLOGIC® PM7xx/8xx or ION7550/7650 Power and Energy Meter available from Schneider Electric. An IED apparatus includes a controller that provides control and processing capabilities for the electrical characteristic(s) measured by the apparatus's sensor.

Amplitude of the Peak Correlation

The magnitude values of the peak correlation between a given pair of IEDs relate to the quality of the frequency variation data taken from both devices. If the IEDs $M_1 \ldots M_{10}$ are able to somewhat accurately measure and log frequency data over a time interval, a peak correlation value will occur within the correlation data. While the maximum value of the peak correlation within a data set can vary, it is more important that the peak correlation of the variation data set be sufficiently greater in magnitude than the other variation data points.

In the first correlative relationship (a pair of IEDs on Grid A 304), there is a single, pronounced point of peak correlation at a particular cycle count offset (or more generally at a particular periodic indicator offset value). This point of maximum correlation is very apparent, and provides the cycle count offset, or how far apart the respective cycle counts are between the point of peak correlation, between the pair of IEDs installed on Grid A (see also the example above in FIGS. 1-2). In the second correlative relationship (a different pair of IEDs on Grid B), again there is a single, pronounced point of peak correlation. While the peak correlation of the second relationship (Grid B) is not as pronounced as the first relationship (Grid A), it still clearly indicates a common relationship between the pair of IEDs located on Grid B (again, see also the example in FIGS. 1-2). In the third correlative relationship (one IED on Grid A and one IED on Grid B), the peak correlation is less apparent. As shown in FIG. 4, the peak correlation of a pair of IEDs located on different electrical grids is low relative to the peak correlations for a pair of IEDs located on the same electrical grid. In an example, if the peak correlation value for a given IED pair is at least 25% higher than the next highest correlation value for that IED pair, the grid identification algorithm 320 determines that the IED pair are installed on the same electrical grid. Otherwise, the grid identification algorithm 320 determines that the IED pair are not in the same electrical grid. Alternately, any other suitable predetermined amount can be used.

In most cases, there will be a clear peak correlation of an IED pair combination located on the same electrical grid with respect to the other correlative data for these same IEDs (particularly if the two IEDs are in proximity to each other). The amplitude (or value) of the peak correlation will depend on the quality of the cycle-by-cycle frequency variation data collected from the respective IEDs. Correlation data taken from IEDs located on two different electrical grids 304, 306 generally will not consistently exhibit an obvious peak correlation, and the peak correlation may be muted relative to the peak correlations of IEDs located on the same electrical grid.

It can be useful to determine how the peak correlation of a variation data set from an IED pair combination relates both absolutely and relatively to other variation data within the same variation data set. It is also useful to compare the absolute and relative peak correlations across multiple data sets for different IED pair combinations. An absolute threshold can be used to determine whether a relationship exists or whether more variation data samples need to be obtained. Alternately, the peak correlation can be compared with the next highest correlation value in a variation data set to determine the strength and quality of the variation data set (i.e., a relative threshold). Finally, a combination of the two thresholds (both absolute and relative) can be used to determine whether a relationship exists and/or if more data needs to be taken.

Location of the Peak Correlation

In an implementation, the master controller 310 instructs or commands each discrete IED ($M_1$-$M_{10}$) in a sequential order at a predetermined time interval to begin storing variation data and a periodic indicator value (e.g., a cycle count marker) for the electrical characteristic in the current or voltage being monitored by the IED. FIGS. 5A-5H illustrates a simple example of sequentially instructing each IED to begin storing the variation data indicative of an electrical characteristic in the current or voltage being monitored. In FIG. 5A, the master controller 310 sends one or more instructions to the first IED ($M_1$) to begin storing a number of consecutive periodic frequency data points and to mark concurrently at least one of these data points as a periodic indicator value (e.g., a cycle count). The first IED ($M_1$) either responds to the master controller 310 that it has begun logging (frequency, amplitude, or phase) variation data, or the master controller 310 rereads or queries the IED ($M_1$) to ensure that variation data logging has begun. The master controller 310 sends one or more instructions to the second IED ($M_2$) to begin collecting a number of consecutive periodic frequency data points and to mark concurrently at least one of these data points with a periodic indicator value (e.g., a cycle count). The second IED ($M_2$) either responds to the master controller 310 that it has begun logging variation data, or the master controller 310 rereads the IED ($M_2$) to ensure that variation data logging has begun. The master controller 310 continues for each IED to consecutively initiate the logging of variation data and verifying that logging has begun in each IED ($M_3, \ldots M_n$) at least until every capable IED or a subset thereof in the power monitoring system 300 is logging (frequency, amplitude, or phase) variation data.

Figure 2:
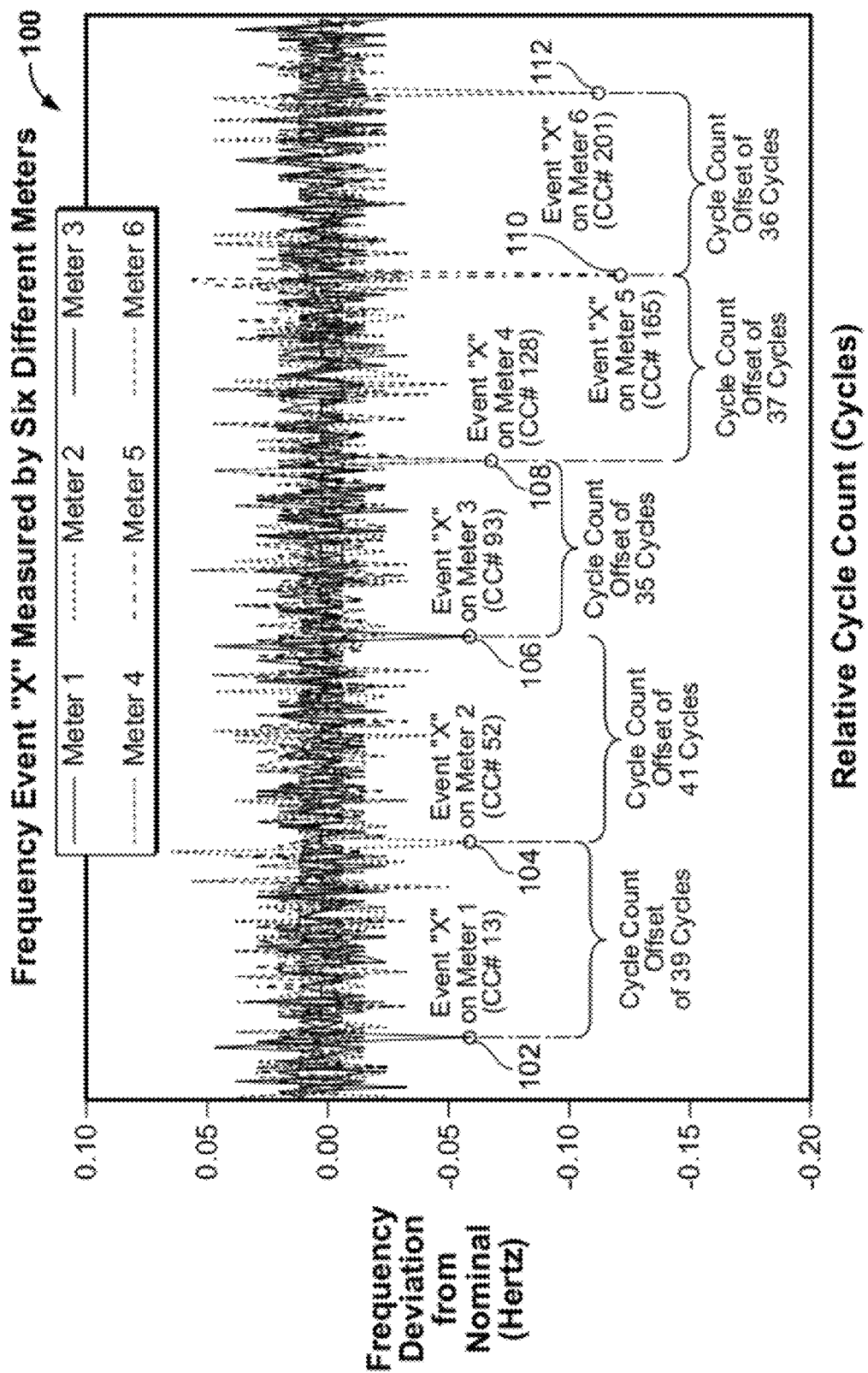
FIG. 2 is the same diagram shown in FIG. 1 with the cycle count offsets shown between the time that each meter measured the same event.

For the sake of discussion, assume that there are six capable IEDs in the monitoring system ($M_1, M_2, M_3, M_4, M_5,$ and $M_6$) and the variation data that they collected is shown in FIG. 1 as a graphical plot 100. Obviously fewer or more IEDs can be present in any given power monitoring system. Because each IED was initiated sequentially, there will be an offset in the periodic indicator value corresponding to the variation data due to the dynamic latencies between each variation data logging initiation. As a result of these dynamic latencies in initiating the variation data collection, an electrical Event X will not appear to occur at the same time in the variation data (i.e., there is an offset in the periodic indicator values, or cycle counts, between each IED's variation data as shown in FIG. 2). In an implementation in which full cycle counts are used as the periodic indicator, the offset corresponds to an integer multiple of cycle counts as shown in FIG. 1.

The same electrical Event X, which is an anomalous electrical event on the power monitoring system 300, such as a lightning strike, a voltage sag or swell, an electrical transient, a disturbance, an electrical notch, or other phenomenon defined in the IEEE or IEC standards, is measured by each of the IEDs at a corresponding periodic indicator (cycle count) at points 102, 104, 106, 108, 110, 112 as shown. The ordinate axis corresponds to frequency variation data, or data indicative of how much the measured frequency deviates from a nominal frequency in Hertz, such as 60 Hz for North America. For example, the Event X was measured by a first IED at cycle count number 13, by a second IED at cycle count number 52, and so forth. In FIG. 2, the cycle count offsets representing the difference in cycle counts that each consecutive IED measured Event X are shown on the diagram. For example, there is a cycle count offset of 39 cycles between the time that the first IED reported measuring Event X and the second IED reported measuring the same Event X.

With this knowledge, a predetermined order of the peak correlations can be expected for all capable IEDs based on the sequence of variation data logging initiation, assuming the IEDs are part of the same electrical grid. In the case of FIGS. 1-2, variation data logging was initiated in IED $M_1$ before IED $M_2$, variation data logging was initiated in IED $M_2$ before IED $M_3$, and so forth. A graphical plot of the correlation data for the IED pairs would take the form of FIG. 4, although the exemplary graphical plot of FIG. 4 is not based upon the frequency variation data from FIGS. 1-2. The peak correlation for the first pair combination of IEDs, $M_1$ and $M_2$, will occur sooner (i.e., closer to the center of the diagram) than the peak correlation for a second pair combination of IEDs, $M_1$ and $M_3$, because $M_3$ received the instruction to begin logging variation data after $M_2$ received its same instruction. Assuming that IED $M_1$ is used as the reference device when comparing with IED $M_2$, the peak correlation between this pair combination will be to the left of the center of the diagram. If IED $M_2$ is the reference device when comparing with IED $M_1$, the peak correlation between this pair combination will be to the right of the center of the diagram.

If the IEDs are compared in the sequential order in which their variation data logging was initiated (i.e., in the order of: $M_1$, $M_2$, $M_3$, $M_4$, $M_5$, $M_6$), the corresponding peak correlations for each pair combination (e.g., $M_1$-$M_2$, $M_1$-$M_3$, $M_1$-$M_4$, and so forth) will progress from the center of the plot to the left of the plot when $M_1$ is used as the reference IED in the data alignment algorithm. This is important because if the peak correlations do not appear in the sequential order in which the variation data logging was initiated, the solution is incorrect. The erroneous solution can be due to poor data such as noisy device relationships, or it can be due to the fact that the two IEDs of an IED pair combination are not located on the same electrical grid. To determine whether a faulty solution is due to noisy relationships, the master controller 310 can evaluate indirect relationships between IED pairs as disclosed in commonly assigned, co-pending U.S. patent application Ser. No. 11/981,428, filed Oct. 31, 2007, entitled "Automated Data Alignment Using Indirect Device Relationships", to determine whether a synchronization solution can be found indirectly. Briefly, indirect synchronization relationships can be evaluated as follows. The master controller 310 determines a direct cycle count offset matrix based upon the highest correlation coefficients produced by correlating frequency variation data from each IED pair $D_{ij}$. For each direct cycle count offset $M_{ij}$, the master controller 310 calculates indirect cycle count offsets as a function of at least $M_k$, where $k \ne i \ne j$, to produce indirect cycle count offsets. The statistical mode of these indirect offsets is compared with the corresponding $M_{ij}$ in the matrix. When they differ, $M_{ij}$ in the direct matrix is adjusted to be equal to the statistical mode. All indirect cycle count offsets for all other unique device pairs, $M_{ij}$, are calculated to iterate to a single solution in which all indirect cycle count offsets are equal to the corresponding direct cycle count offset. If no single synchronization solution can be found, the master controller 310 assumes that the invalid results from the grid identification algorithm 310 are not due to noisy relationships, and proceeds to try to determine whether the IEDs under analysis are on different electrical grids.

If noisy relationships are eliminated as the reason for the invalid results, the grid identification algorithm 320 can determine that the erroneous solution is due to the fact that the individual IEDs of an IED pair combination under analysis are on different electrical grids. Supplemental testing (such as by reinitiating the data alignment algorithm) also helps to establish whether a "noisy" device relationship existed or whether the two IEDs being correlated are not located on the same electrical grid. In FIG. 2, the peak correlation between IED $M_1$ and IED $M_2$ will occur 39 cycles left of the center of the plot. The peak correlation between IED $M_1$ and $M_3$ will occur 80 cycles left of the center of the plot (39 cycles+41 cycles between $M_2$ and $M_3$=80 cycles), and so forth.

If a pair of IEDs are not located on the same electrical grid, their corresponding peak correlation may occur at any point on the plot (left or right of center). In addition, subsequent testing by running the data alignment algorithm on subsequent variation data shows that the peak correlation will shift among random locations because there is no correlation for variation data from different IEDs on truly independent electrical grids. The use of supplemental testing and the assessment of indirect IED pair relationships after each respective test has empirically shown to be a useful method for evaluating whether a pair of IEDs are located on the same electrical grid.

Figure 9:
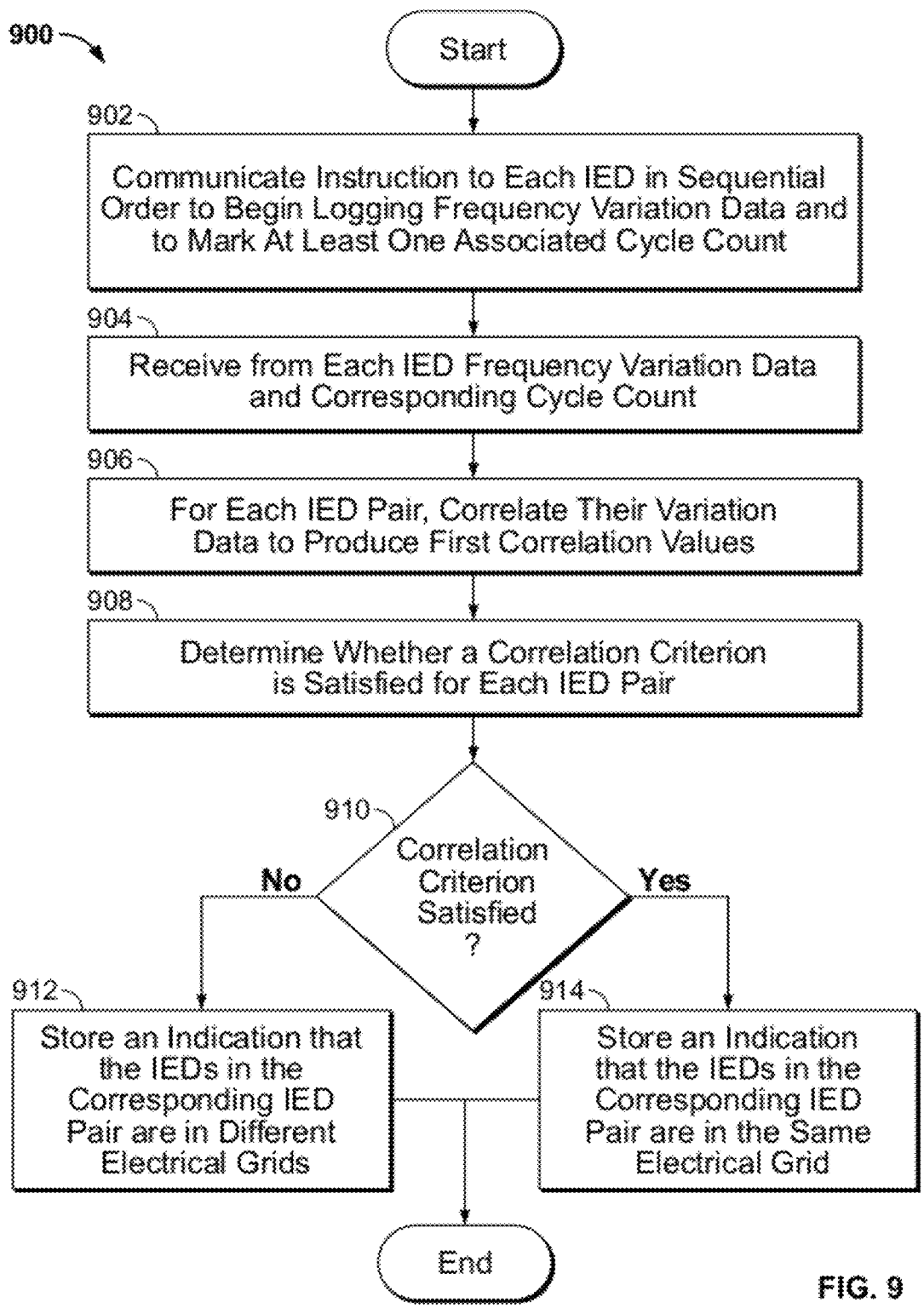
FIG. 9 is a flow chart diagram of an exemplary grid identification algorithm according to an aspect of the present disclosure.

FIG. 9 is a flowchart diagram of an exemplary grid identification algorithm 900 according to an aspect of the present disclosure. The master controller 310 communicates an instruction to each IED in sequential order at a predetermined time interval (i.e., first to IED $M_1$ at time $t_1$, then to IED $M_2$ at time $t_2=t_1+t_d$, then to IED $M_3$ at time $t_3=t_2+t_d$, and so forth, where $t_d$ represents a time delay of a fixed or variable interval) (902). The master controller 310 receives from each IED in the power monitoring system, such as the power monitoring system 300, its corresponding variation data indicative of variations of an electrical characteristic (such as frequency, amplitude, or phase) in a corresponding current or voltage being monitored by the IED (904). Each IED also communicates a periodic indicator value (e.g., a cycle count) corresponding to a point on the current or voltage signal, and the master controller 310 stores the periodic indicator value with the received variation data (904). For each IED pair combination, the mater controller 310 automatically correlates the respective variation data using a data alignment algorithm from each of the pair combinations to produce first correlation values (906). The master controller 310 determines whether a correlation criterion is satisfied for the IED pair combination (908). Each of the first correlation values is associated with a corresponding first periodic indicator value (e.g., a corresponding cycle count). The master controller 310 determines whether the correlation criterion is satisfied (910). If the correlation criterion is not satisfied, the master controller 310 stores an indication that the IEDs in the IED pair combination are in different electrical grids (912). Otherwise, if the correlation criterion is satisfied, the master controller 310 stores an indication that the IEDs in the IED pair combination are in the same electrical grid (914). The indication can correspond to a data value that indicates whether the pair of IEDs in the IED pair combination are in the same or different electrical grids. A textual or graphical representation of the indication can be displayed on a conventional video display (not shown) coupled to the master controller 310.

The correlation criterion can be that there exists no peak correlation value that exceeds a predetermined amount for a given IED pair combination. For example, the predetermined amount can be at least 25% higher or at least 50% higher than the next highest correlation value for the IED pair combination. The correlation criterion can be whether a peak correlation value of the first correlation values exceeds the other first correlation values by a predetermined amount, such as, for example, at least 25% or at least 50% higher than the next highest correlation value. Alternately, the correlation criterion can be whether an absolute value of the most negative of the first correlation values does not exceed an absolute value of the highest of the first correlation values by more than 25% or higher.

In an example, to determine whether the correlation criterion is satisfied, the master controller 310 determines whether a peak correlation offset value associated with the first IED pair combination, which received the instruction from the master controller 310 before a second IED pair combination, occurs before a peak correlation offset value associated with the second IED pair combination. If the peak correlation offset value associated with the first IED pair combination occurs after the peak correlation offset value associated with the second IED pair combination, the master controller 310 determines that the correlation threshold is not satisfied (912).

After the master controller 310 stores the variation data from the IEDs (904), the master controller can communicate an instruction to each of a first pair of IEDs in a sequential order at a predetermined time interval to begin storing second variation data indicative of the electrical characteristic (such as frequency, amplitude, or phase) in the current or voltage being monitored by the first pair of IEDs. The master controller 310 receives from the first pair of IEDs their respective second variation data. The master controller 310 determines which of the first correlation values for the first pair of IEDs has a maximum value to produce a first peak correlation value. The periodic indicator offset value corresponding to the first peak correlation value is called a first peak periodic indicator offset value. The master controller 310 automatically correlates the second variation data to produce second correlation values. Each of the second correlation values is associated with a corresponding second periodic indicator offset value. The master controller 310 determines which of the second correlation values for the first pair of IEDs has a maximum value to produce a second peak correlation value. The second periodic indicator offset value corresponding to the second peak correlation value is called a second peak periodic indicator offset value. The master controller 310 determines whether an absolute difference between the first peak periodic indicator offset value and the second peak periodic indicator offset value exceeds a predetermined threshold. If the absolute difference exceeds the predetermined threshold, the master controller 310 determines that the correlation criterion is not satisfied (912). The predetermined threshold can be zero or less than the absolute difference between the first and second peak periodic indicator offset values.

Instruction Simultaneously Broadcast to all IEDs

In another aspect of this disclosure, the master controller 310 can send a broadcast instruction to all IEDs in the power monitoring system 300 simultaneously. The order in which the IEDs begin logging variation data is somewhat arbitrary and depends on when each IED received the broadcast signal from the master controller 310 and thereafter initiated logging. Assessing indirect device pair relationships is still useful; however, the order of initiation is indeterminate. The results from retesting are less conclusive and can initially show the peak correlations to occur on both sides of the plot's center. Post-analysis of the correlation data allows the grid identification algorithm 320 to determine the order in which the IEDs initiated their variation data logging. Each subsequent test can result in a different order of correlation peaks due to the arbitrary nature of when an IED receives and initiates its variation data logging. However, the peak correlation from an IED pair not located on the same electrical grid will move around the plot—even outside an expected range relative to when the other peak correlations occur. Although the determination of when a correlation peak occurs outside an expected range (and even the bounds of that expected range) is somewhat unpredictable, it does provide an indication (especially when it consistently reoccurs during retesting) that an IED pair combination is not located on the same electrical grid. Furthermore, there will be a consistency that one IED within a particular IED pair combination does not correlate to any other IED located on the other IED's electrical grid when comparing across more than two IEDs. In short, both direct and indirect IED relationships can be a strong indicator of the presence of multiple grids and their respectively located IEDs.

Figure 10:
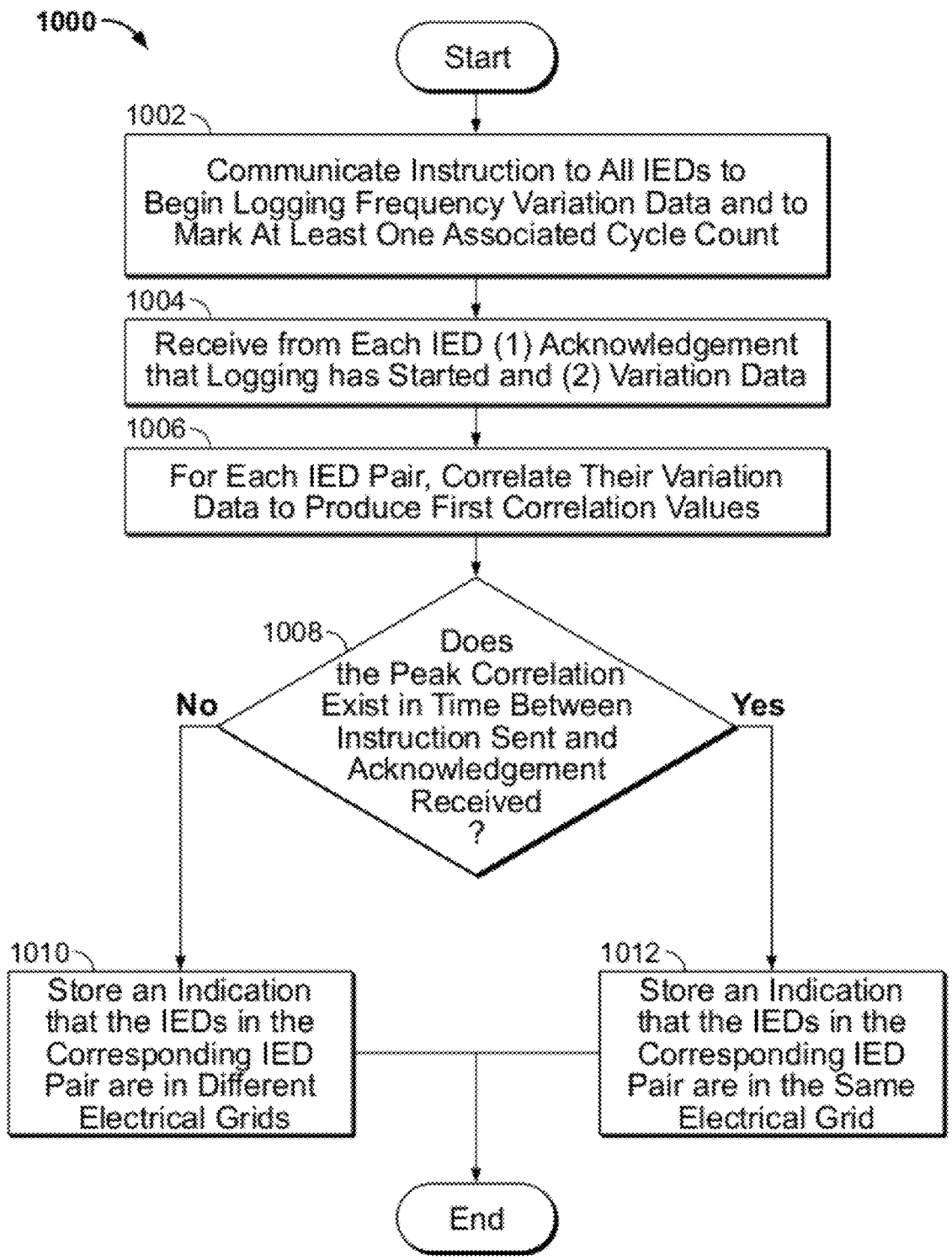
FIG. 10 is a flow chart diagram of an exemplary grid identification algorithm according to another aspect of the present disclosure.

FIG. 10 illustrates another exemplary grid identification algorithm 1000 that is executed by the master controller 310. The master controller 310 communicates an instruction to all of the IEDs in the power monitoring system 300 to begin storing variation data indicative of an electrical characteristic (e.g., frequency, amplitude, phase) in a current or voltage signal being monitored by each of the IEDs (1002). Optionally, the instruction can also instruct the IEDs to mark at least one periodic indicator offset (i.e., cycle countoffset in this example) in the logged variation data (1002). The master controller 310 stores the time that it communicates the instruction as a first time. The master controller 310 receives from each IED in the power monitoring system 300 its corresponding variation data indicative of variations in frequency, amplitude, or phase in the current or voltage being monitored by the IED (1004). Optionally, the master controller 310 can also receive from each IED an acknowledgment that it has begun to log the variation data as instructed (1004). For each IED pair combination, the master controller 310 automatically correlates, using a data alignment algorithm, the variation data from the IED pair combination to produce correlation values (1006). The master controller 310 determines whether a peak correlation value of the correlation values occurs between the time that the master controller 310 sent the instruction to the IEDs and the time that one of the IEDs has started to store the variation data. The master controller 310 can determine the latter time by either receiving an acknowledgement from the target IED that it has received the instruction and begun to log variation data, or the master controller 310 can query the target IED to determine whether it has begun logging variation data.

The master controller 310 determines whether a peak correlation value occurred between the time that the master controller 310 sent the instruction to the IEDs and the time that one of the IEDs started to store the variation data (1008). If so, the master controller 310 stores an indication in a conventional memory that the IEDs in the corresponding IED pair combination are installed on the same electrical grid (1012). Otherwise, the master controller 310 stores an indication in the memory that the IEDs in the corresponding IED pair combination are not in the same electrical grid (1010).

Relative Time of the Peak Correlation's Occurrence

As indicated above, when the master controller 310 successively communicates the logging initiation instruction to each of the IEDs, there is a sequence to the peak correlations of IED pairs based on when each IED receives and acts upon the instruction to begin collecting variation data. Based on the process described by FIGS. 5A-5H, the expected location of a specific IED pair's peak correlation can be bound. Put simply, temporal knowledge of when an instruction or command to begin logging variation data was communicated to an IED and when that command was verified as received and acted upon by the master controller 310 gives a definite indication of the range where the peak correlation should occur with respect to an IED pair combination.

Referring to the example shown in FIGS. 5A-5H, assume that the master controller 310 communicates an instruction to begin logging frequency data ($t_1$) to the IED $M_1$ at 02:18:20:00 (where hh:mm:ss:ms). One second later, at 02:18:21:00, the master controller 310 determines, by querying the IED to verify that it has begun logging variation data or by receiving an acknowledgment from the IED that it has begun logging variation data, that the IED $M_1$ has indeed begun to log variation data. During this period, the master controller 310 sends an instruction to IED $M_2$ at 02:18:20:30 to begin logging variation data and later receives an indication one second later at 02:18:21:30 that IED $M_2$ has begun logging frequency data. If the concurrent periodic indicator is in cycles and the electrical grid is operating at 60 Hz, each cycle is 16.66 milliseconds.

For IED $M_1$, the time between when the instruction to begin logging the variation data was sent and when it was verified as being initiated is one second (02:18:21:00–02:18:20:00=00:00:01:00) or 60 cycles (1000 msec÷16.66 msec≈60). For IED $M_2$, the time between when the instruction to begin logging the variation data was sent and when it was verified as being initiated is also one second (02:18:21:30–02:18:20:30=00:00:01:00) or 60 cycles (1000 msec÷16.66 msec≈60). The total time period between when the instruction to initiate logging of variation data was sent to the IED $M_1$ and when it was verified that both IED $M_1$ and IED $M_2$ had indeed initiated logging of variation data was 1.5 seconds (02:18:21:30–02:18:20:00=00:00:01:30) or 90 cycles (1500 msec÷16.66 msec≈90).

It can be concluded that the periodic indicator (or cycle count) offset (based on the peak correlation) between IED $M_1$ and IED $M_2$ can be no more than 90 cycles apart, assuming that both are on the same electrical grid. These two IEDs are bound by 90 cycles with a very strong likelihood that IED $M_1$ will be leading IED $M_2$ (because the master controller 310 first sent the instruction to IED $M_1$). If the cycle count offset between IED $M_1$ and IED $M_2$ is greater than 90 cycles or if IED $M_2$ appears to have initiated its variation data logging before IED $M_1$ (based on the location of the peak correlation between the IED pair), there is a strong likelihood that IED $M_1$ and IED $M_2$ are either on different electrical grids or that the data is of poor quality. As mentioned above, evaluating the indirect relationships between IED $M_1$ and IED $M_2$ or just sampling and analyzing another variation data set can determine which of these two possibilities are more likely.

Symmetry of Correlation Data about the Peak

As stated above, IEDs located on different electrical grids 304, 306 will not be solvable (i.e., their variation data will not consistently correlate with one another over repeated iterations of the data alignment algorithm) due to the frequency independence between two different electrical grids 304, 306. Another indicator of whether a pair of IEDs are located on the same electrical grid is the symmetry of the correlated variation data about the peak correlation. Empirical testing has shown that a pair of IEDs located on the same electrical grid will exhibit a level of symmetry about the peak correlation. There are several methods of determining the degree of symmetry about the peak correlation such as statistical correlation or other pattern recognition techniques.

Figure 6:
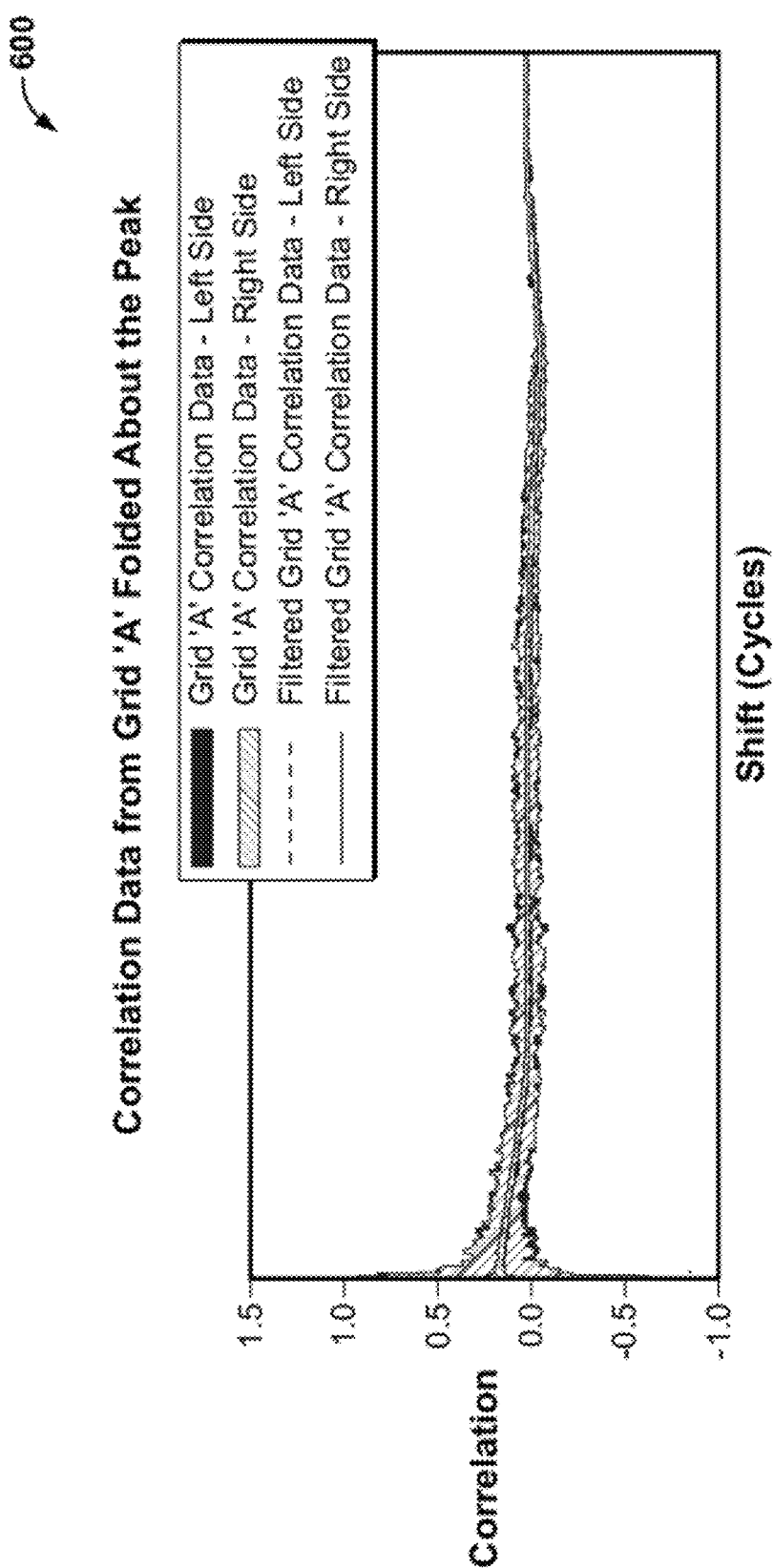
FIG. 6 is a graphical plot of correlation values folded about a peak correlation for a pair of IEDs that are both located in the same electrical grid.
Figure 7:
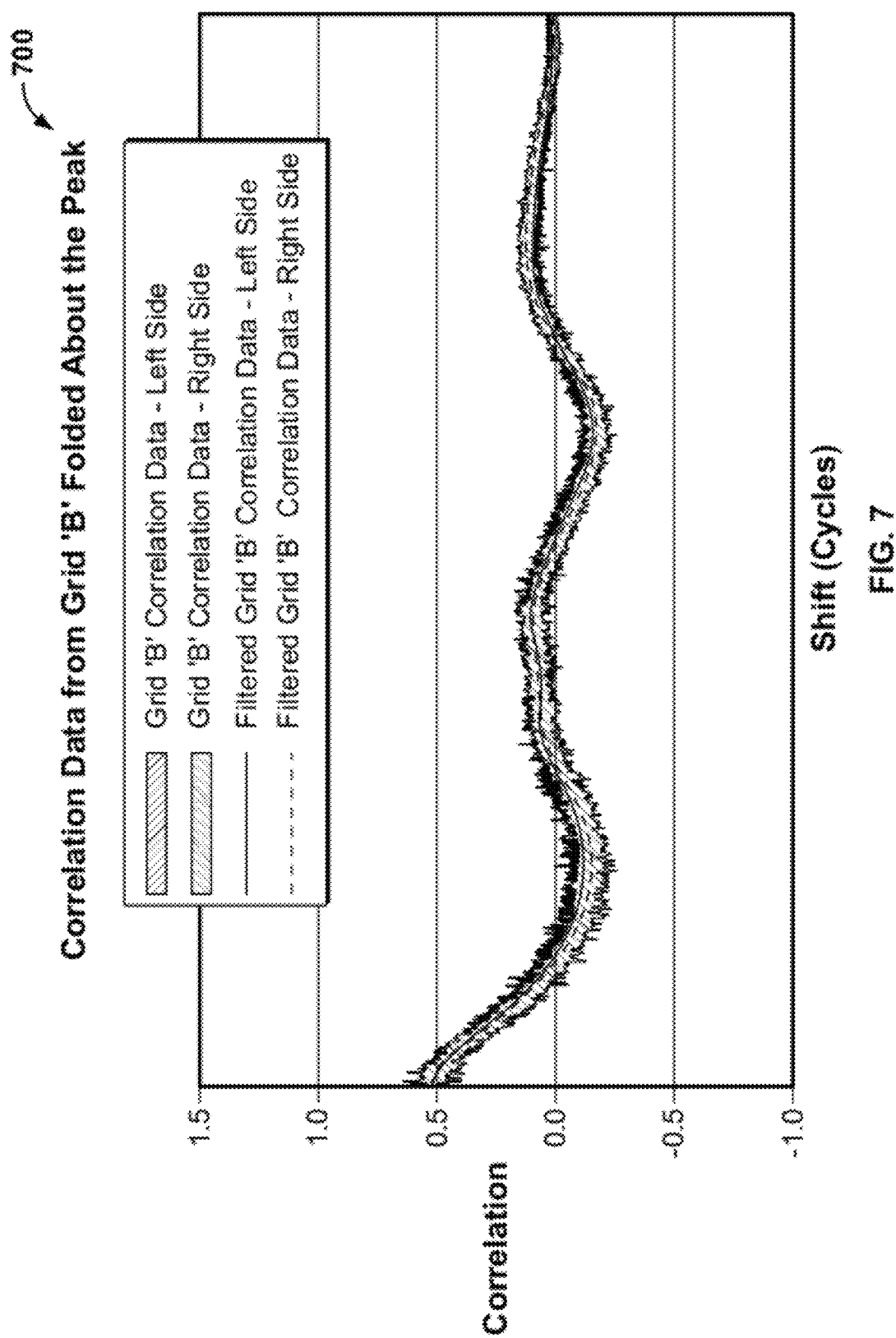
FIG. 7 is a graphical plot of correlation values folded about a peak correlation for a pair of IEDs that are both located in a different electrical grid from those shown in FIG. 6.

Using FIG. 4 as an example, the (frequency) variation data from three different pairs of IEDs is being correlated; a first pair of IEDs on electrical Grid A, such as the electrical grid 304, a second pair of IEDs on electrical Grid B, such as the electrical grid 306, and a third pair of IEDs on different grids (one on electrical Grid A and one on electrical Grid B). Assuming that the correlated variation data from the first pair (electrical Grid A) is folded about the peak correlation and then filtered (for purposes of clarity), it can be seen from the graphical plot 600 shown in FIG. 6 that these two IEDs exhibit strong symmetry on either side of the peak correlation. In fact, the correlation data on each side of the peak correlation is almost the mirror image of the other. This is due to the strong similarity of the variation data from each IED in the first pair (again, because they are located on the same electric grid and the variation data being compared is pseudo-synchronous). Performing the same operation on the second pair of IEDs (located on electrical Grid B) produces similar results as can be seen in the graphical plot 700 shown in FIG. 7. Again, this is due to the same reasons mentioned for the first pair of IEDs on electrical Grid A.

Figure 8:
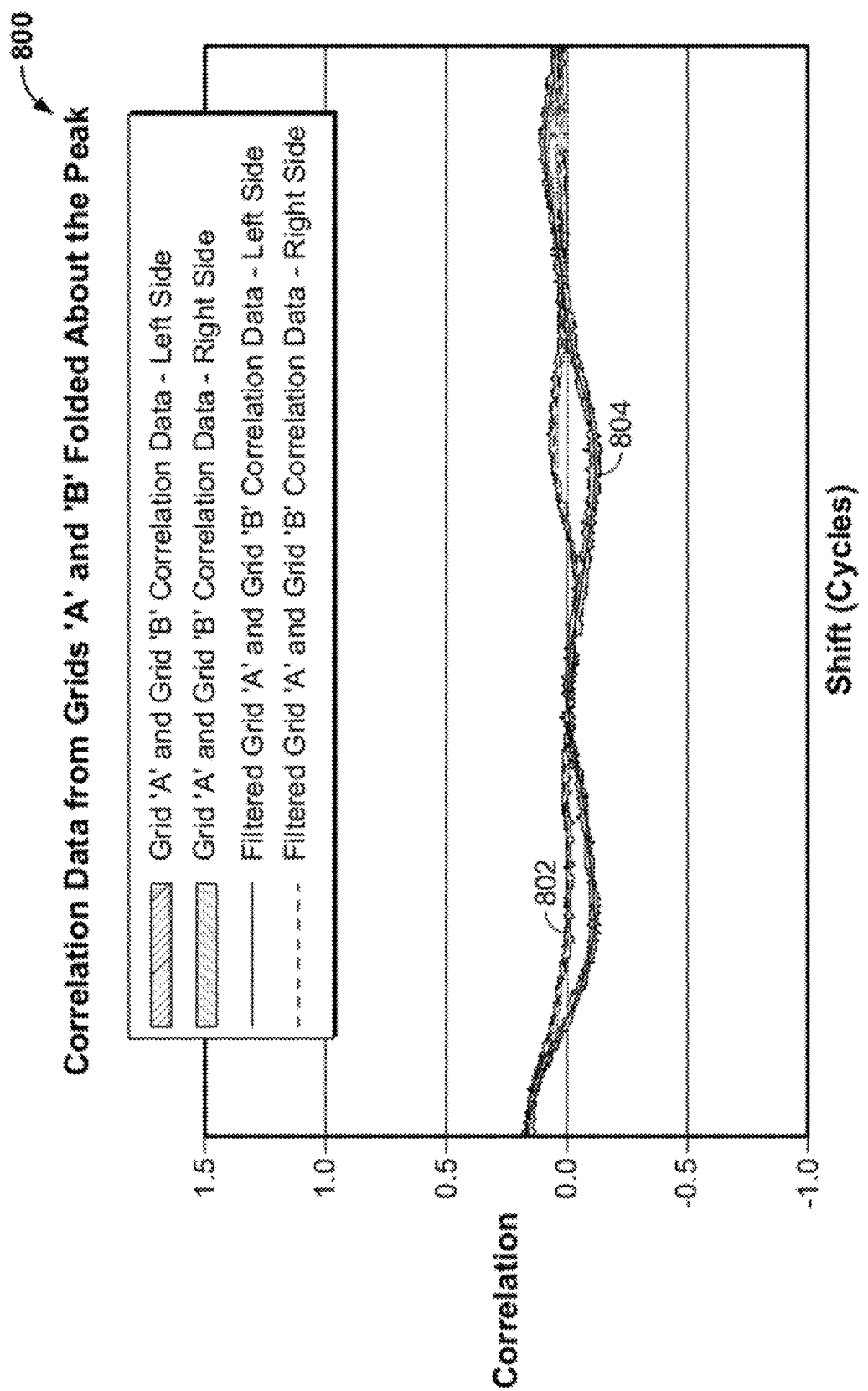
FIG. 8 is a graphical plot of correlation values folded about a peak correlation for a pair of IEDs that are located on different electrical grids.

It is a different matter when a third pair of IEDs from different electrical grids is evaluated in this manner (see FIG. 8). It can be seen in the graphical plot 800 shown in FIG. 8 that the correlation curves 802, 804 for the two IEDs in the third pair are not symmetric about the peak correlation as in the two previous examples where the IED pairs are located on the same electrical grid. In fact, the correlation curves 802, 804 on each side of the peak correlation in this example correlates only about half as well as the IED pairs located on the same electrical grid, which is significant. This weak correlation occurs particularly when the data alignment algorithm is carried out on a limited number of IED pairs at a time.

Therefore, the level of symmetry about the peak correlation between correlated variation data between a given IED pair is an indication of whether the two IEDs in the IED pair are located on the same electrical grid. The level of symmetry can be measured using correlations (as in this example) or other conventional techniques for determining the similarity of two data sets. The level of symmetry can be determined by applying a conventional correlation function to the correlation values to produce a symmetry correlation value. If the symmetry correlation value exceeds a symmetry threshold value, such as about 0.75 or higher, the grid identification algorithm 320 can determine that the IEDs in the IED pair are installed on the same electrical grid. Alternately, the level of symmetry can be determined by subtracting the correlation values for both curves 802, 804 (referring in FIG. 8) at each cycle count offset point in the plot, determine whether a root mean square of the resulting set of difference values exceeds a threshold. For a perfectly symmetrical data set, the root mean square (RMS) value will be zero. The threshold can be set slightly above zero or as a percentage of the peak correlation value.

Combination of Techniques

Each of the grid identification techniques described above alone can determine whether IEDs are located on a different electrical grid. The grid identification techniques can also identify erroneous solutions for offsets given by the data alignment algorithm. Any of the foregoing grid identification techniques can be combined to identify which IEDs are located on which electrical grids.

FIG. 4 illustrates some of the benefits of using more than one grid identification technique. Both the IED pair on Grid A and the IED pair on Grid B exhibit a significantly higher peak correlation (both absolute and relative) as compared with the surrounding data as discussed above. In both cases, the location of each respective peak correlation of the IED pairs is valid based on the sequence in which the original data sets were obtained. As discussed above, both of these IED pairs are very symmetric around their respective peak correlation (again, see FIGS. 6-7). Any combination or all of these observations can be used to support a conclusion that these IED pairs are indeed located on the same electric grid.

Conversely, the pair of IEDs sampled from two different electric grids (Grid A and Grid B) in FIG. 4 exhibits a very low peak correlation 406 compared to the surrounding correlation values. The peak correlation of this IED pair occurs 7209 cycles from the center of the graphical plot, which equates to approximately 2 minutes (7209 cycles×0.016 sec/cycle≈120.15 seconds); however, all IEDs were verified as having started their variation data logging initiated within 15 seconds. Thus, concluding that the solution given by the data alignment algorithm for the offset of the periodic indicator (i.e., cycle count offset in this example) would be erroneous in this example. Finally, the determination that this IED pair exhibits a less-than-expected symmetry about its peak correlation would again indicate that these two devices are not on the same electrical grid (see discussion above in connection with FIG. 8).

It has been demonstrated that using a combination of the grid identification techniques described herein will provide a much stronger determination of whether or not two IEDs are located on the same electrical grid. Combining these results with concurring results from the analysis of indirect IED relationships will further bolster this determination. Ultimately, the grid identification algorithm disclosed herein provides another layer of automation for users of more complex power monitoring systems.

With the growing need for monitoring data synchronization from an array of diverse customers including data centers to petrochemical facilities to electric utilities, there is a great need for the ability to more cost-effectively synchronize disparate electrical grids (specifically, the electrical data measured on the grids). The grid identification algorithms disclosed herein can reduce the overall cost and complexity of power monitoring systems while improving the data analyses and solutions for the end-user.

It should be noted that the grid identification algorithms 320, 900, 1000 illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Any of the algorithms disclosed herein include machine readable instructions for execution by: (a) a microprocessor, (b) a microcontroller, and/or (c) any other suitable processing device. It will be readily understood that the IEDs $M_1$-$M_{10}$ and other IEDs referenced herein each includes such a suitable processing device. Any algorithm, such as the grid identification algorithms 320, 900, 1000, disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts or functional block diagrams depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically identifying a plurality of independent electrical grids in a utility system that includes a plurality of intelligent electronic devices (IEDs) communicatively linked to a master controller in the utility system, comprising:

communicating from the master controller an instruction to each of the IEDs in a sequential order at a predetermined time interval (a) to begin storing variation data indicative of variations of an electrical characteristic in a corresponding monitored current or voltage signal being monitored by respective ones of the IEDs, and (b) to store a point on the signal as a periodic indicator value;

receiving by the master controller from each of the IEDs the variation data and the corresponding periodic indicator value;

for a plurality of pair combinations of the IEDs, automatically correlating, via the master controller, the respective variation data from each of the pair combinations to produce a plurality of first correlation values and determining, responsive to the automatically correlating, via the master controller, whether a correlation criterion is satisfied for each of the pair combinations, wherein each of the first correlation values is associated with a corresponding first periodic indicator offset value, wherein the first periodic indicator offset value corresponds to a difference between the respective periodic indicator values for the pair combination; and responsive to the correlation criterion not being satisfied for a flagged one of the pair combinations, storing an indication that the IEDs corresponding to the flagged pair combination are in different electrical grids.

2. The method of claim 1, wherein the correlation criterion is whether a peak correlation value of the first correlation values exceeds the other first correlation values by a predetermined amount.

3. The method of claim 2, further comprising determining a level of symmetry of the first correlation values relative to the peak correlation value as a function of the first periodic indicator offset values, and responsive to the level satisfying a criterion, determining that the correlation criterion is satisfied.

4. The method of claim 3, wherein the level of symmetry is determined by applying a correlation function to the first correlation values to produce a symmetry correlation value, the criterion including whether the symmetry correlation value exceeds about 0.75.

5. The method of claim 2, wherein the predetermined amount is at least 25% higher than the next highest correlation value.

6. The method of claim 1, wherein the correlation criterion is that no peak correlation value, which exceeds a predetermined amount, exists for the pair combination.

7. The method of claim 6, wherein the predetermined amount is at least 25% higher than the next highest correlation value for the pair combination.

8. The method of claim 1, wherein the determining whether the correlation criterion is satisfied includes:
    determining whether a peak correlation value associated with a first pair combination of the IEDs occurs before a peak correlation value associated with a second pair combination of the IEDs; and
    responsive to the peak correlation value associated with the first pair combination occurring after the peak correlation value associated with the second pair combination, determining that the correlation threshold is not satisfied.

9. The method of claim 8, wherein the determining whether the correlation criterion is satisfied includes:
    responsive to the variation data being stored, communicating from the master controller an instruction to each of a first pair of the IEDs in a sequential order at a time interval to begin storing second variation data indicative of the electrical characteristic in the corresponding monitored current or voltage signal being monitored by respective ones of the first pair of the IEDs;
    receiving by the master controller from each of the first pair of the IEDs the second variation data;
    determining which of the first correlation values for the first pair of the IEDs has a maximum value to produce a first peak correlation value, and wherein the first periodic indicator offset value corresponding to the first peak correlation value is a first peak periodic indicator offset value;
    automatically correlating the second variation data to produce a plurality of second correlation values, wherein each of the second correlation values is associated with a corresponding second periodic indicator offset value;
    responsive to the automatically correlating the second variation data:
        determining which of the second correlation values for the first pair of the IEDs has a maximum value to produce a second peak correlation value, and wherein the second periodic indicator offset value corresponding to the second peak correlation offset value is a second peak periodic indicator offset value, and
        determining whether an absolute difference between the first peak periodic indicator offset value and the second peak periodic indicator offset value exceeds a predetermined threshold; and
    responsive to the absolute difference exceeding the predetermined threshold, determining that the correlation criterion is not satisfied.

10. The method of claim 1, wherein the periodic indicator value is a cycle count that corresponds to a number of full or half cycles of the monitored current or voltage signal.

11. The method of claim 10, wherein each of the cycles indicates a periodic crossing of zero volts or amps by the monitored current or voltage signal.

12. The method of claim 1, responsive to the correlation criterion being satisfied for a flagged one of the pair combinations, storing an indication that the IEDs corresponding to the flagged pair combination are in the same electrical grid.

13. The method of claim 12, wherein the predetermined threshold is zero or less than the absolute difference between the first and second peak periodic indicator values.

14. The method of claim 1, wherein the correlation criterion is whether an absolute value of the most negative of the first correlation values does not exceed an absolute value of the highest of the first correlation values by more than 25%.

15. The method of claim 1, further comprising:
    responsive to the variation data being stored, communicating from the master controller an instruction to each of a first pair of the IEDs in a sequential order at a time interval to begin storing second variation data indicative of the electrical characteristic in the corresponding monitored current or voltage signal being monitored by respective ones of the first pair of the IEDs;
    receiving by the master controller from each of the first pair of the IEDs the second variation data;
    determining which of the first correlation values for the first pair of the IEDs has a maximum value to produce a first peak correlation value, and wherein the first periodic indicator offset value corresponding to the first peak correlation value is a first peak periodic indicator offset value;
    automatically correlating the second variation data to produce a plurality of second correlation values, wherein each of the second correlation values is associated with a corresponding second periodic indicator offset value;
    responsive to the automatically correlating the second variation data:
        determining which of the second correlation values for the first pair of the IEDs has a maximum value to produce a second peak correlation value, and wherein the second periodic indicator offset value corresponding to the second peak correlation offset value is a second peak periodic indicator offset value, and
        determining whether an absolute difference between the first peak periodic indicator offset value and the second peak periodic indicator offset value exceeds a predetermined threshold; and
    responsive to the absolute difference exceeding the predetermined threshold, determining that the correlation criterion is not satisfied.

16. The method of claim 1, wherein the master controller is one of the IEDs.

17. The method of claim 1, wherein the variation data is indicative of frequency variations or amplitude variations in the monitored current or voltage signal and wherein the electrical characteristic is a frequency or amplitude of the monitored current or voltage signal.

18. A method of automatically identifying a plurality of independent electrical grids in a utility system that includes a plurality of intelligent electronic devices (IEDs) communicatively linked to a master controller in the utility system, comprising:
    communicating from the master controller an instruction to each of the IEDs to begin storing variation data indicative of variations of an electrical characteristic in a corresponding monitored current or voltage signal being monitored by respective ones of the IEDs;
    storing a first time that the instruction is communicated from the master controller to each of the IEDs;
    determining a second time corresponding to a time that the IED has started to store the variation data;
    receiving by the master controller from each of the IEDs the variation data;
    for a plurality of pair combinations of the IEDs, automatically correlating, via the master controller, the respective variation data from each of the pair combinations to produce a plurality of first correlation values and determining, responsive to the automatically correlating, via the master controller, whether a peak one of the first correlation values occurs between the first time and the second time for one of the IEDs in the respective pair combination; and responsive to the peak one of the first correlation values not occurring between the first time and the second time, storing an indication that the IEDs corresponding to the pair combination are in different electrical grids.

19. The method of claim 18, wherein the determining the second time includes communicating to the master controller an acknowledgement that the variation data is being stored.

20. The method of claim 18, wherein the instruction is communicated to each of the IEDs in a sequential order at a predetermined time interval.

21. A non-transitory computer-readable medium having a computer-readable program code embodied therein, the computer-readable program code adapted to be executed to implement a method of automatically identifying a plurality of independent electrical grids in a utility system that includes a plurality of intelligent electronic devices (IEDs) communicatively linked to a master controller in the utility system, the method comprising:

communicating from the master controller an instruction to each of the IEDs to begin storing variation data indicative of variations of an electrical characteristic in a corresponding monitored current or voltage signal being monitored by respective ones of the IEDs;

storing a first time that the instruction is communicated from the master controller to each of the IEDs;

determining a second time corresponding to a time that the IED has started to store the variation data;

receiving by the master controller from each of the IEDs the variation data;

for a plurality of pair combinations of the IEDs, automatically correlating, via the master controller, the respective variation data from each of the pair combinations to produce a plurality of first correlation values and determining, responsive to the automatically correlating, via the master controller, whether a peak one of the first correlation values occurs between the first time and the second time for one of the IEDs in the respective pair combination; and responsive to the peak one of the first correlation values not occurring between the first time and the second time, storing an indication that the IEDs corresponding to the pair combination are in different electrical grids.

* * * * *